Figure 1:
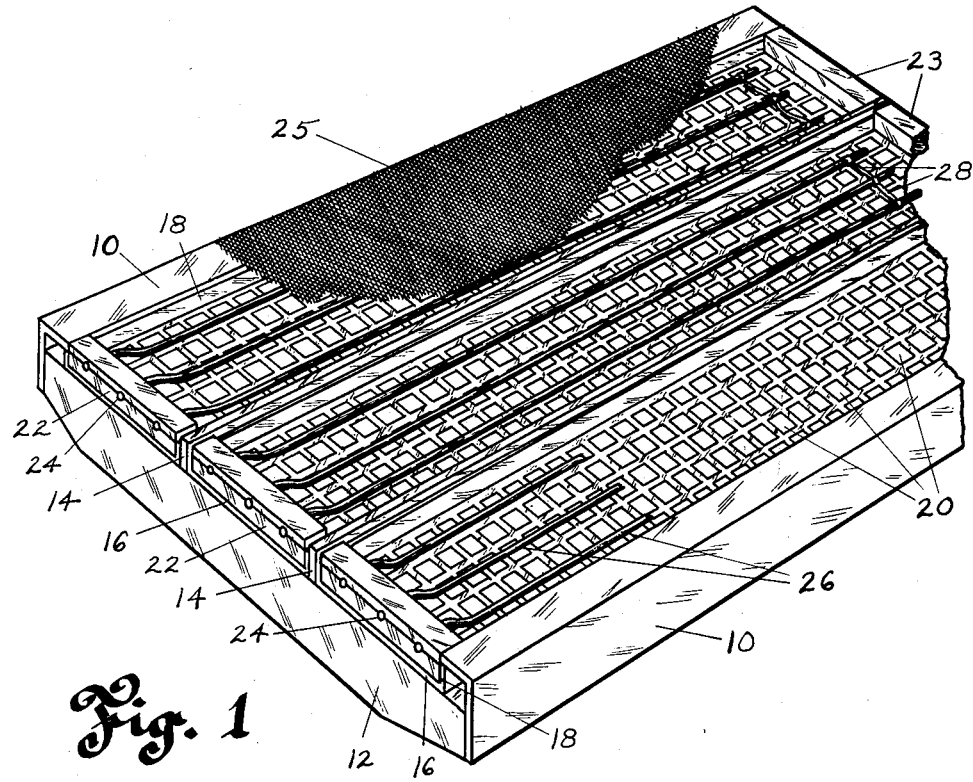

Nov. 11, 1952  J. H. LINHARDT ET AL  2,617,533
VIBRATING EQUIPMENT
Filed Dec. 17, 1948  2 SHEETS—SHEET 1

INVENTORS
John H. Linhardt and
Lewis H. Lehman
BY
ATTORNEY

Nov. 11, 1952 J. H. LINHARDT ET AL 2,617,533
VIBRATING EQUIPMENT

Filed Dec. 17, 1948 2 SHEETS—SHEET 2

INVENTORS
John H. Linhardt and
BY Lewis H. Lehman
Ray Eilers
ATTORNEY

Patented Nov. 11, 1952

2,617,533

UNITED STATES PATENT OFFICE 2,617,533

VIBRATING EQUIPMENT

John H. Linhardt, Inglewood, Calif., and Lewis H. Lehman, Chicago, Ill.; said Linhardt assignor of his interest to said Lehman, as trustee Application December 17, 1948, Serial No. 65,757

3 Claims. (Cl. 209—383)

This invention relates to improvements in vibrating equipment. More particularly, this invention relates to an improved method and apparatus that can be used with vibrating equipment to prevent "blinding" of the separating screens used in such equipment.

It is therefore an object of the present invention to provide an improved method and apparatus that can be used with vibrating equipment to prevent "blinding" of the separating screens used in such equipment.

In the operation of vibrating equipment, materials to be separated are customarily placed upon the separating screens or grids of such equipment and vibrated until the small-sized particles pass through the screens or grids and are thus separated from the large-sized particles which cannot pass through those screens or grids. Where the materials which are placed upon the the screens or grids are composed of particles that vary widely in size, the small-sized particles usually pass through the screens or grids rather readily; but where the materials are composed of particles which vary but little in size, the larger particles are not much larger than the openings of the screens or grids and the lower portions of those particles penetrate those openings for substantial distances. This fact frequently causes those larger particles to lodge in the openings of the screens or grids since they can not pass through these openings but have penetrated so far into those openings that they cannot easily rise up and free themselves. The lodgment of large numbers of large-sized particles in the openings of the screens or grids of vibrating equipment. causes "blinding" of those screens or grids; and "blinding" materially reduces the through-put of the screens or grids by preventing ready passage of the small-sized particles through the openings of those screens or grids.

Various proposals have been made and a number have been tried; some contemplating frequent stopping of the vibrating equipment to empty or "unblind" the screen. Other proposals were directed to moving scrapers along the bottoms of the separating screens or grids to force the lodged particles up and out of the openings in those screens or grids. Still other proposals contemplated making the screens or grids as drums that revolved past brushes which forced the particles out of the openings. While some of these various proposals could provide momentary "unblinding" of the screens or grids, they were not capable of assuring truly satisfactory separation of the materials placed upon the screens. The present invention on the other hand, assures efficient "blinding-free" operation of the screens of vibrating equipment by positioning flexible elements immediately below those screens and by supporting those elements so they can flex and can nudge the lodged particles out of the openings in the screens. This action of the flexible elements will be continuous, and it will prevent lodgment of particles in any of the openings of the screens; thus assuring the small-sized particles full access to all of the openings of the screens. It is therefore an object of the present invention to position flexible elements immediately below the separating screens of vibrating equipment and to support those elements so they can flex and nudge particles tending to lodge in the openings of the screens.

The flexible elements provided by the present invention do not require an outside source of excitation; instead they respond to the vibration imparted to the screens or screen supports to flex and move into and out of contact with the screens. This arrangement provides inexpensive but certain "blinding-free" operation of the screens of vibrating equipment.

The flexible elements provided by the present invention are confined and supported immediately adjacent the bottoms of the screens by supports which underlie the flexible elements. These supports hold the flexible elements so closely adjacent the undersides of the screens that they avoid the generation within those elements of unduly large dynamic forces. As a result, the flexible elements are enabled to engage and move those portions, of the particles lodged in the openings in the screens, which project below the undersides of the screens without bruising those particles and without causing them to fly out of the vibrating equipment. It is therefore an object of the present invention to provide flexible elements that are closely confined between the separating screens and the supports that are disposed short distances below those screens.

In many screening and separating operations it is extremely important to avoid adulteration of the material which passes through the screens. Unfortunately, many materials which must not be contaminated have pronounced tendencies toward "blinding" of the screens. Such materials cannot be screened by many prior methods since adulterants were necessarily introduced during the "unblinding" operation. For example, where a brush was used to force lodged particles out of the openings of the screens, the bristles of the brush tended to break off or come loose and be admixed with the screened particles. The present invention obviates this problem by making the flexible members of materials which will not break or shred, and also by making the flexible members of material which is the same as or similar to the material being screened. For example, where certain rubber-like materials are to be screened, the flexible elements would be made of that rubber-like material so that if any portions of the surfaces of the flexible elements were to be abraded or worn, those portions would not adulterate the screened material; the materials being the same. It is therefore an object of the present invention to provide flexible elements adjacent the separating screens of vibrating equipment and to make those elements of material which is the same as, or similar to, the material being screened.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purposes of illustration only and do not limit the invention and that the invention will be defined by the appended claims.

Figure 2:
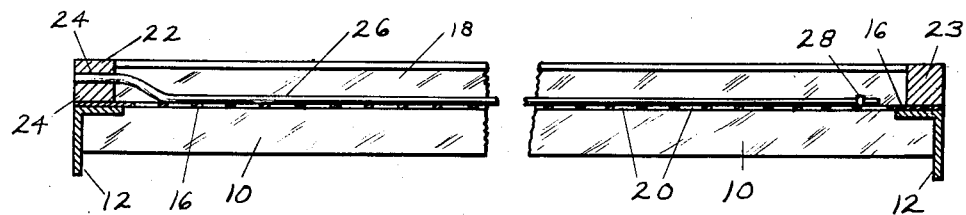
Figure 3:
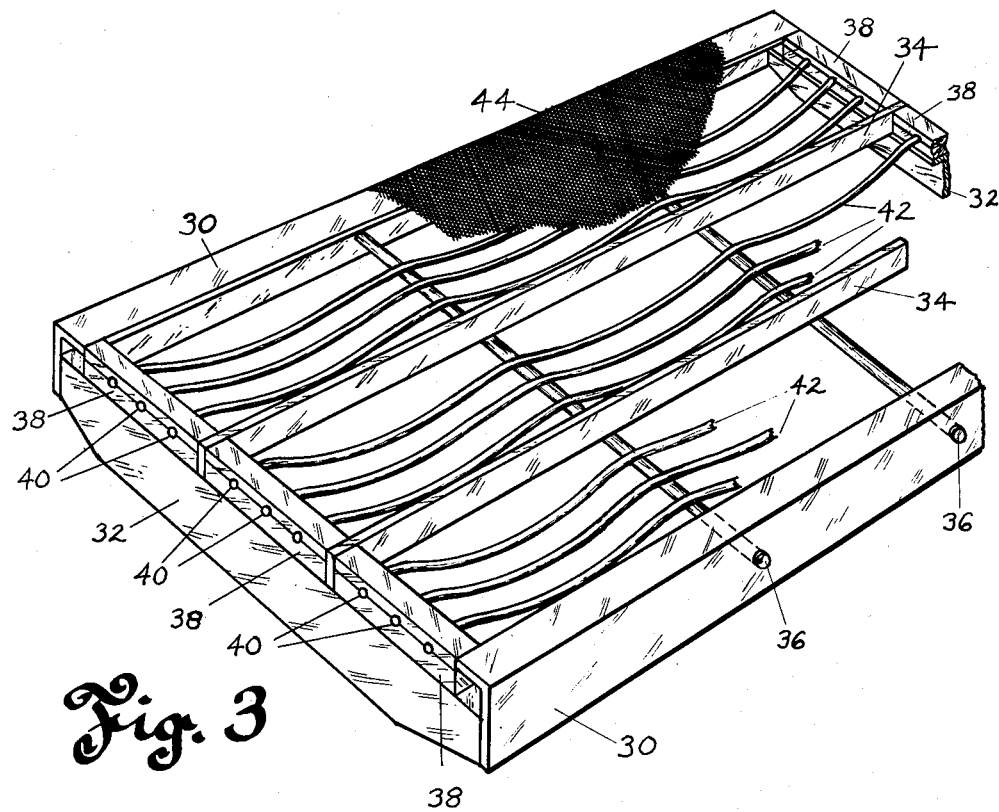
Figure 4:
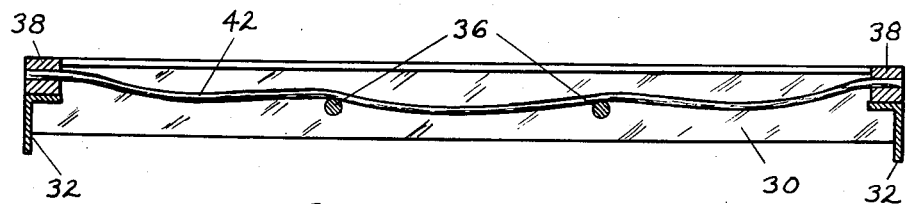

In the drawing, Fig. 1 is a partially-broken, perspective view of the deck of a vibrating device which is equipped with one type of flexible element provided by the present invention, Fig. 2 is a broken, cross-sectional, side view of the deck of Fig. 1, Fig. 3 is a partially-broken, perspective view of another deck of a vibrating device which is equipped with another type of flexible element provided by the present invention, and Fig. 4 is a cross-sectional, side view of the deck of Fig. 3.

Referring to the drawing in detail, the longitudinally-extending angles that form the sides of the deck of a vibrating device are denoted by the numeral 10. Transversely-extending angles 12 are disposed between the ends of the angles 10, and the angles 12 constitute the ends of the deck. The angles 10 and 12 may be secured together in a number of different ways, but welding is preferred since it provides a strong and durable structure. Also secured to the angles 12 are longitudinally-extending separators 14; and these separators are preferably secured to the angles 12 by welding.

Disposed between the separators 14 of the deck are a number of perforated plates 16 which have upturned edges 18 along the sides thereof. The edges 18 stiffen the plates 16 and permit a large number of sizable openings 20 to be formed in the plates 16 while keeping the plates self-supporting; the openings 20 being made large enough to permit free flow of particles through the plates 16. In those instances where the plates 16 are long enough to require it, additional support may be provided for the plates 16 by securing additional transverse elements between angles 10 and underneath plates 16. In the spaces above the ends of the plates 16 are disposed supporting elements 22 and 23; and these supporting elements confine the plates 16 while supporting the ends of the screen 25. The supporting elements 22 are slit along their lengths and are provided with transversely extending semi-cylindrical recesses 24. The slitting of the supporting elements 22 permits ready insertion and removal of flexible elements 26 into and out of the recesses 24. The recesses 24 are in register with each other to form recesses that can receive and confine the ends of the flexible elements 26; the recesses 24 having smaller radii than the radii of the flexible elements 26 to enable the supporting elements 22 to clamp and hold the ends of the flexible elements 26.

The flexible elements 26 have their left-hand ends fixedly spaced apart and spaced above the plates 16 by the supporting elements 22. The rest of the flexible elements 26 can sag down and rest upon the plates 16, and the right-hand ends of the flexible elements 26 are free to move about on the plates 16. To prevent twisting and tangling of the right-hand ends of the flexible elements 26, connecting links 28 are secured between those ends. While the flexible elements are initially placed parallel to each other as shown, those elements can flex and move rather freely relative to the plates 16 and relative to each other.

A porous screen 25 is secured to the top edges of angles 10 and supporting elements 22 and 23; and that screen serves to separate material placed on it, as by permitting the smaller particles of the material to pass through the openings in the screen while supporting the larger particles on the top of the screen. The screen 25 will limit upward movement of the flexible elements 26, and the plates 16 will limit downward movement of the flexible elements 26; and thus the elements 26 will be closely confined adjacent the under surface of the screen cloth 25.

With this arrangement the flexible members 26 will be able to respond to the vibration imparted to the deck by the vibrating equipment of which the deck is a component part, to flex and move towards and away from the under surface of the screen cloth 25. Because the flexible elements are only confined at their left hand ends, they can move from side to side as they move toward and away from the under surface of the screen cloth; consequently the flexible elements 26 can approach virtually all of the under surface of the screen cloth 25. In doing so, the flexible elements 26 will recurrently engage those portions of the large-sized particles which project through the openings in the screen cloth 25, or they will directly engage the under surface of the screen cloth 25. These engagements will impart upwardly directed impulses to the particles on the screen and keep those particles from lodging in the openings in screen cloth 25 and "blinding" that cloth.

It is desirable to limit the force which the flexible elements 26 can impart to the screen cloth 25 and the particles thereon, since those particles might be of such a nature that they would be bruised or caused to fly from the screen. The present invention provides such limitation by positioning the flexible elements 26 so close to the screen cloth 25 that those elements cannot develop excessive momentum. The amount of dynamic force generated in elements 26 will be determined by the distance between the plates 16 and the screen cloth 25 and by the flexibility of the elements 26; but the degree of flexibility is easily regulated by proper selection of the diameter and stiffness of those elements, and the distance can be predetermined in each case. Where easily bruised materials such as peas are to be screened, the distance between the screen cloth 25 and the plates 16 should be less than three (3) inches and the flexible elements 26 should be hollow tubes of fabric, soft rubber, and elastomeric plastic material, or the like. Moreover, the plates 16 should be of fabric, rubber, an elastomeric plastic material, or the like so the flexible elements 26 will not crush the peas when the elements 26 flex downwardly toward the plates 16. By being flexible the plates 16 will be able to yield and prevent such crushing. Moreover, the openings 20 in the plates 16 are so much larger than the openings in the screen cloth 25 that most of the peas will pass directly through the openings 20. However, no injury will come to those peas which are momentarily held by plates 16 since the conjoint yielding of the materials in plates 16 and in elements 26 will avoid injury to the peas.

Where harder materials, such as coal, crushed or ground nut shells, or the like are to be screened, the plates 16 need not be made of a yielding material but can be made of metal or wood. Moreover, depending upon the nature and character of the material to be screened, the flexible elements 26 can be made solid as well as tubular, they can be made with various regular and irregular cross sections, and they can be made of bare metal, rubber-coated metal, plastic-coated metal, fabric, or plastic.

The screen cloth 25 shown in the drawing is typical of the woven wire cloths used in many types of vibrating equipment. However, the present invention is not limited to use with screen cloths of this type; instead it is usable with perforated plates, silk screens, soldered wire screens, and the other types of screens customarily used with vibrating equipment.

Among the materials that can be used in the flexible elements 26, the plates 16, and the connecting links 28 are the various synthetic rubbers, regenerated celluloses, vinyl acetate and vinyl chloride copolymers, polyvinyl acetates, polyvinyl chlorides, polyethylene, polystyrene, and like materials; and they can be used alone or as coatings on metal elements. It is desirable, wherever possible, to make the flexible elements 26 and plates 16 of material which is the same as, or similar to, the material being screened. In such cases, any abrading of the flexible elements 26 or plates 16 could not adulterate the material passing through the screen since the abraded material would be of the same or similar character as the screened material. Ordinarily, abrasion of flexible elements 26 and plates 16 is so infinitesimal as to be insignificant; but in those few cases where it is essential to maintain great purity of the screened material, it is desirable to select a material for the flexible elements 26 and plates 16 which will be the same as, or inert in the presence of, the material being screened.

In Fig. 1, the flexible elements 26 are shown approximately parallel to each other. While those elements may assume that position initially, they will move from side to side and up and down in response to the motion of the deck. In fact, the flexible elements 26 may even overlap each other occasionally; but the connecting links 28 will tend to keep the elements 26 from being entangled.

In Figs. 3 and 4 a modified form of the present invention is shown and described. The number 30 denotes the longitudinally-extending angles that form the sides of the deck of a vibrating device; and transversely-extending angles 32 are disposed between and secured to the ends of angles 30. Also disposed between and secured to angles 30 are rods 36; and these rods underlie longitudinally-extending separators 34. The angles 30 and 32 are preferably secured together, as by welding; and the separators 34 are preferably welded to angles 32. The rods 36 are preferably seated in openings in the angles 30.

Supports 38 are disposed between the separators 34 at each end of the deck; and those supports are slit along their lengths. The supports 38 are also provided with transversely-extending, semi-cylindrical recesses 40 which are registerable with each other to form cylindrical recesses for the ends of flexible elements 42. The cylindrical recesses formed in supports 38 by recesses 40 will be smaller than the ends of flexible elements 42; thereby facilitating securement of elements 42 to supports 38. A screen cloth 44 is secured to the upper surfaces of angles 30 and supports 38.

The flexible elements 42, which can be made of the same materials of which the flexible elements 26 of Figs. 1 and 2 are made, are supported at both ends by supports 38. As a result, they can be supported by the spaced rods 36 rather than by perforated plates, such as plates 16 of Figs. 1 and 2. The rods 36 will hold the flexible elements 42 closely adjacent the under surface of the screen cloth 44 and thereby limit the momentum that can be developed in those elements.

It is desirable to make the rods 36 of circular cross section for two reasons. First, such a cross section avoids sharp corners that might tend to cut or abrade the flexible elements; and second, such a cross section will not tend to hold the particles being screened. Instead, the arcuate upper faces of the rods 36 will cause those particles to slide off. This avoids bruising of fragile particles being screened.

For purposes of clarity, only three flexible elements were shown in each of the spaces between the separators of the decks. In practice, as many as seven or more of those elements may be used between the spaced separators. Whereas two preferred embodiments of the present invention have been shown and described in the drawing and accompanying description, it should be obvious to those skilled in the art that various changes may be made in the form of the invention without affecting the scope thereof.

What I claim is:

1. In a vibrating screen unit, a frame having side walls and end walls, a screen supported on the top of said walls, a support secured to the walls and parallel and closely underlying the screen, elongated, flexible, strand-like members of substantial mass secured to an end wall of the frame above the support and below the screen, said elongated members extending along the support over substantially the extent of the screen, with the major portions thereof resting upon the support.

2. In a vibrating screen unit, a frame having side walls and end walls, a screen supported on the top of said walls, a support secured to the walls and parallel and closely underlying the screen, elongated, flexible, strand-like members of substantial mass secured to an end wall of the frame above the support and below the screen, said elongated members extending along the support over substantially the extent of the screen, with the major portions thereof resting upon the support and connecting links between adjacent free ends of said flexible members.

3. In a vibrating screen unit, a frame having side walls and end walls, a screen supported on the top of said walls, a support secured to the walls and parallel and closely underlying the screen, elongated, flexible, strand-like members of substantial mass secured to an end wall of the frame adjacent the upper face of said wall above the support and below the screen, said elongated members extending along the support over substantially the extent of the screen, with the major portions thereof resting upon the support.

JOHN H. LINHARDT.
LEWIS H. LEHMAN.

REFERENCES CITED

The following references are of record in the file of this patent:

UNITED STATES PATENTS

| Number | Name | Date |
| --- | --- | --- |
| 63,316 | Sinclair | Mar. 26, 1867 |
| 131,079 | Binkley | Sept. 3, 1872 |
| 250,947 | Moser et al. | Dec. 13, 1881 |
| 573,674 | Lough | Dec. 22, 1896 |
| 658,385 | Maun | Sept. 25, 1900 |
| 658,700 | Butler | Sept. 25, 1900 |
| 680,466 | Sherk | Aug. 13, 1901 |
| 735,730 | Draver | Aug. 11, 1903 |
| 811,128 | Case | Jan. 30, 1906 |
| 1,064,344 | Kibler | June 10, 1913 |
| 1,069,453 | McDaniel | Aug. 5, 1913 |
| 1,870,629 | Ingraham | Aug. 9, 1932 |
| 2,086,199 | Williams | July 6, 1937 |